US007840090B2

(12) United States Patent  (10) Patent No.: US 7,840,090 B2
Asai  (45) Date of Patent: Nov. 23, 2010

(54) SLIDESHOW GENERATING APPARATUS, SLIDESHOW-DATA GENERATING APPARATUS, CONTROL METHODS THEREFOR AND PROGRAMS FOR CONTROLLING SAME

(75) Inventor: Arito Asai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1110 days.

(21) Appl. No.: 11/508,825

(22) Filed: Aug. 24, 2006

(65) Prior Publication Data

US 2007/0058207 A1  Mar. 15, 2007

(30) Foreign Application Priority Data

Aug. 25, 2005  (JP)  ............... 2005-243625

(51) Int. Cl.
  *G06K 9/36*  (2006.01)
(52) U.S. Cl. .................. 382/276; 382/254; 382/283; 345/626; 345/619; 345/629
(58) Field of Classification Search .............. 382/276, 382/254, 283; 345/619, 626, 629
  See application file for complete search history.

(56) References Cited

U.S. PATENT DOCUMENTS 6,738,424 B1 * 5/2004 Allmen et al. ......... 375/240.08

7,412,079 B2 * 8/2008 Fukushima .................. 382/107
2002/0051495 A1 * 5/2002 Kadono .................. 375/240.25
2003/0090751 A1 * 5/2003 Itokawa et al. ............. 358/538
2004/0095374 A1 * 5/2004 Jojic et al. .................. 345/716

FOREIGN PATENT DOCUMENTS

JP  11-149285 A  6/1999
JP  2000-20743 A  1/2000
JP  2004-194338 A  7/2004

OTHER PUBLICATIONS

Notification of Reasons for Allowance dated Aug. 10, 2010 issued in corresponding Japanese Patent Appplication No. 2005-243625 (with English translation).

* cited by examiner

*Primary Examiner*—Matthew C Bella
*Assistant Examiner*—Mike Rahmjoo
(74) *Attorney, Agent, or Firm*—Birch, Stewart, Kolasch & Birch, LLP

(57) ABSTRACT

A background image wherein areas in which still images are to be rendered have been defined is prepared. Product images are obtained by multiplying mask images and positioned still images together. The background image and the product images are added to obtain a sum image that constitutes one frame of a slideshow. A plurality of still-image portions obtained from a plurality of still images in one frame are contained in the sum image. An advanced slideshow is thus obtained.

4 Claims, 12 Drawing Sheets

Fig. 3

SCENARIO DATA

| FRAME NO. | RENDERING POSITION NO. | COMBINING POSITION X | COMBINING POSITION Y | IMAGE WIDTH | IMAGE HEIGHT | ANGLE OF ROTATION |
|---|---|---|---|---|---|---|
| 1 | 1 | X1 | Y1 | W1 | H1 | θ1 |
| 1 | 2 | X2 | Y2 | W2 | H2 | θ2 |
| 2 | 1 | X11 | Y11 | W11 | H11 | θ11 |
| 2 | 2 | X12 | Y12 | W12 | H12 | θ12 |
| .. | .. | .. | .. | .. | .. | .. |

*Fig. 9*
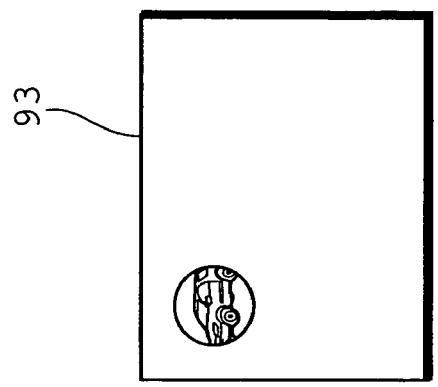
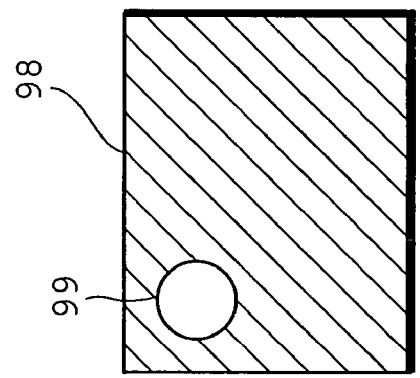
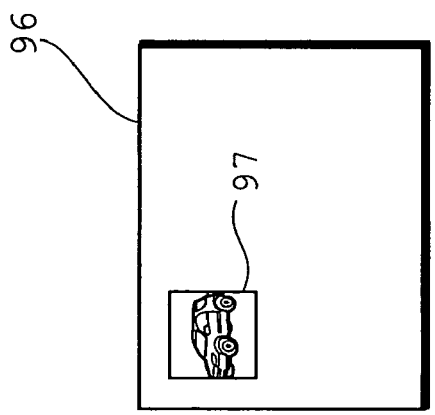

SLIDESHOW GENERATING APPARATUS, SLIDESHOW-DATA GENERATING APPARATUS, CONTROL METHODS THEREFOR AND PROGRAMS FOR CONTROLLING SAME

BACKGROUND OF THE INVENTION

1. Field of the Invention

This invention relates to a slideshow generating apparatus, an apparatus for generating slideshow data, as well as methods and programs for controlling such apparatus.

2. Description of the Related Art

A slideshow presents a display of still images of a plurality of frames in order. Such a slideshow may be a basic function of an operating system and can also display background images of a number of frames, which have been stored in a folder, in the form of a slideshow. A further example of the prior art generates a slideshow that can be displayed using a DVD (Digital Versatile Disk) player (see the specification of Japanese Patent Application Laid-Open No. 2004-194338).

In any case, however, the prior art has not given consideration to the generation of a highly sophisticated slideshow.

SUMMARY OF THE INVENTION

Accordingly, an object of the present invention is to generate a highly sophisticated slideshow.

According to a first aspect of the present invention, the foregoing object is attained by providing a slideshow generating apparatus comprising: a background moving-image storage device for storing background moving-image data representing a background moving image composed of a number of frames of a background image wherein an area in which a still image is rendered has been defined as a mask area; a still-image data input device for inputting still-image data; a scenario data storage device for storing scenario data that defines a position corresponding to the mask area in the background image, the position being one at which the still image represented by the still-image data that has been input from the still-image data input device is rendered; a positioning device (positioning means) for positioning the still image, which is represented by the still-image data that has been input from the still-image data input device, at the position represented by the scenario data stored in the scenario data storage device; a mask-image data storage device for storing mask-image data representing a mask image in which a still-image rendering area has been defined in association with the mask area of the background image, an area from which the still-image rendering area has been excluded being defined as a mask area; and a moving-image combining device (moving-image combining means) for generating moving-image data for display by repeatedly executing, with regard to the number of frames of the background image, processing that combines the background image constituting the background moving image represented by the background moving-image data that has been stored in the background moving-image data storage device, the still image that has been positioned by the positioning device, and the mask image represented by the mask-image data that has been stored in the mask image-data storage device.

The first aspect of the present invention also provides a control method suited to the above-described slideshow generating apparatus. Specifically, the first aspect of the present invention provides a method of controlling a slideshow generating apparatus, comprising the steps of: storing background moving-image data representing a background moving image composed of a number of frames of a background image wherein an area in which a still image is rendered has been defined as a mask area; storing mask-image data representing a mask image in which a still-image rendering area has been defined in association with the mask area of the background image, an area from which the still-image rendering area has been excluded being defined as a mask area; inputting still-image data; storing scenario data that defines a position corresponding to the mask area in the background image, the position being one at which the still image represented by the still-image data that has been input is rendered; positioning the still image, which is represented by the still-image data that has been input, at the position represented by the scenario data stored; and generating moving-image data for display by repeatedly executing, with regard to the number of frames of the background image, processing that combines the background image constituting the background moving image represented by the background moving-image data that has been stored, the still image that has been positioned, and the mask image represented by the mask-image data that has been stored.

The first aspect of the present invention also provides a program for implementing the above-described method of controlling the slideshow generating apparatus.

In accordance with the first aspect of the present invention, background moving-image data is stored. The background moving-image data represents a background moving image composed of a number of frames of a background image wherein an area in which a still image is rendered has been defined as a mask area. (In a case where an image has been superimposed, the area is one in which the superimposed image is displayed as is. This is a so-called "black area" the level of which is 0.) Further, scenario data that defines a position at which the still image is rendered in the background image is stored. The still image is positioned at the position defined by the scenario data. Furthermore, mask-image data is stored. The mask-image data represents a mask image in which a still-image rendering area has been defined in association with the mask area, an area from which the still-image rendering area has been excluded being defined as a mask area. Processing for combining (superimposing) the background image, the positioned still image and the mask image is executed repeatedly with regard to the number of frames of background image constituting the background moving image, whereby moving-image data for display is generated.

In accordance with the first aspect of the present invention, display moving-image data representing a slideshow in which a desired still image is displayed upon being positioned in a mask area of a background image can be obtained. By preparing a plurality of frames of mask-image data and a plurality of frames of still images, the plurality of frames of still images can be displayed in one frame, thereby making it possible to obtain a sophisticated slideshow.

By way of example, the moving-image combining device includes a multiplying circuit for multiplying the mask image and the still image that has been positioned by the positioning device, thereby generating a product image; an adding circuit for adding the background image and the product image generated by the multiplying circuit; and a controller for controlling the multiplying circuit and the adding circuit so as to repeat, with regard to the number of frames of the background image, multiplication processing performed in the multiplying circuit and addition processing performed in the adding circuit.

According to a second aspect of the present invention, the foregoing object is attained by providing an apparatus for generating slideshow data, comprising: a background moving-image data generating device (background moving-image data generating means) for generating background moving-image data wherein an area in which a still image is rendered is defined as a mask area in a number of frames of a background image constituting a background moving image; and a mask-image data generating device for defining a still-image rendering area in association with the mask area defined in the background image constituting the background moving image represented by the background moving-image data generated by the background moving-image data generating device, and generating mask-image data representing a mask image wherein an area from which the still-image rendering area has been excluded is defined as a mask area.

The second aspect of the present invention also provides a control method suited to the above-described apparatus for generating slideshow data. Specifically, the second aspect of the present invention provides a method of controlling a slideshow-data generating apparatus, comprising the steps of: generating background moving-image data wherein an area in which a still image is rendered is defined as a mask area in a number of frames of a background image constituting a background moving image; and defining a still-image rendering area in association with the mask area defined in the background image constituting the background moving image represented by the background moving-image data generated, and generating mask-image data representing a mask image wherein an area from which the still-image rendering area has been excluded is defined as a mask area.

The second aspect of the present invention also provides a program for implementing the above-described method of controlling the slideshow-data generating apparatus.

The second aspect of the present invention generates the background moving-image data and the mask-image data used in the first aspect of the present invention. Specifically, background moving-image data wherein an area in which a still image is rendered is defined as a mask area is generated in a number of frames of a background image constituting a background moving image. Mask-image data representing a mask image is generated. In the mask image, a still-image rendering area is defined in association with a mask area defined in the background image constituting the background moving image, and an area from which this still-image rendering area is excluded is defined as a mask area.

A slideshow can thus be generated by the first aspect of the present invention using the background moving-image data and the mask-image data generated in the second aspect of the invention.

The apparatus for generating the slideshow data may further comprise calculating means for calculating a number of contiguous pixels in at least one of the background image and mask image; and compressing means for compressing the background moving-image data and the mask-image data based upon the number of pixels calculated by the calculating means. Since the mask area and still-image rendering area often have identical pixels, such as pixels representing white or black, that are contiguous, highly efficient compression can be achieved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates an example of scenario data;

FIG. 9 illustrates the manner in which a layer image is generated;

DESCRIPTION OF THE PREFERRED EMBODIMENT

A preferred embodiment of the present invention will now be described in detail with reference to the drawings.

Figure 1:
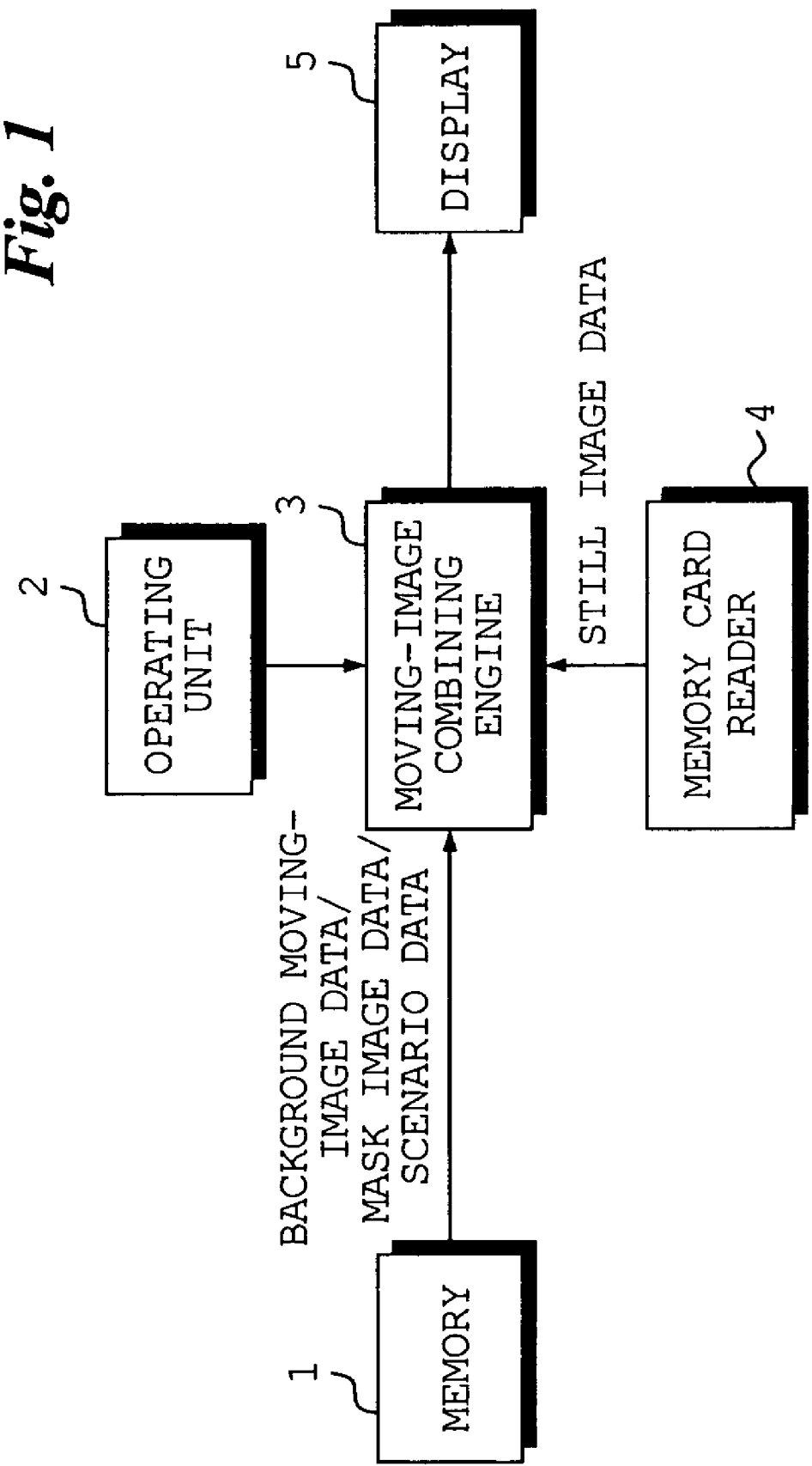
FIG. 1 is a block diagram illustrating the electrical structure of a slideshow generating apparatus.

FIG. 1 is a block diagram illustrating the electrical structure of a slideshow generating apparatus embodying the present invention.

The slideshow generating apparatus according to this embodiment generates a so-called advanced slideshow in which a still image is rendered on a background moving image. The still image is represented by still-image data that has been recorded on a digital recording medium such as a memory card carried about by the user [another digital medium such as a CD (Compact Disk) may also be employed].

Background moving-image data, mask-image data, scenario data and a program for controlling operation described later have been stored beforehand in a memory 1 of the slideshow generating apparatus. The background moving-image data represents a moving image displayed as the background of a still image. The mask-image data is multiplied by a still image, whereby there is generated a product image to be added to a background image that constitutes the background moving image. The scenario data defines a position, etc., for rendering a still image, which is supplied by the user, in each background image of a number of frames constituting the background moving image. The background moving-image data, mask-image data and scenario data read from the memory 1 is input to a moving-image combining engine 3.

The slideshow generating apparatus is provided with a memory card reader 4 in which a memory card carried about by the user is loaded. Still-image data that has been stored on the memory card is read and applied to the moving-image combining engine 3.

An operation signal that is output from an operating unit 2 is applied to the moving-image combining engine 3. Still-image data utilized in a slideshow is selected by the operating unit 2 from among still-image data that has been stored on the memory card.

Moving-image data for display, which represents the slideshow generated in the moving-image combining engine 3, is applied to a display unit 5. A slideshow is thus displayed on the display screen of the display unit 5.

The display moving-image data representing the slideshow generated may be recorded on a recording medium such as a DVD (Digital Versatile Disk). In such case the slideshow generating apparatus would be provided with a recording unit.

Figure 2:
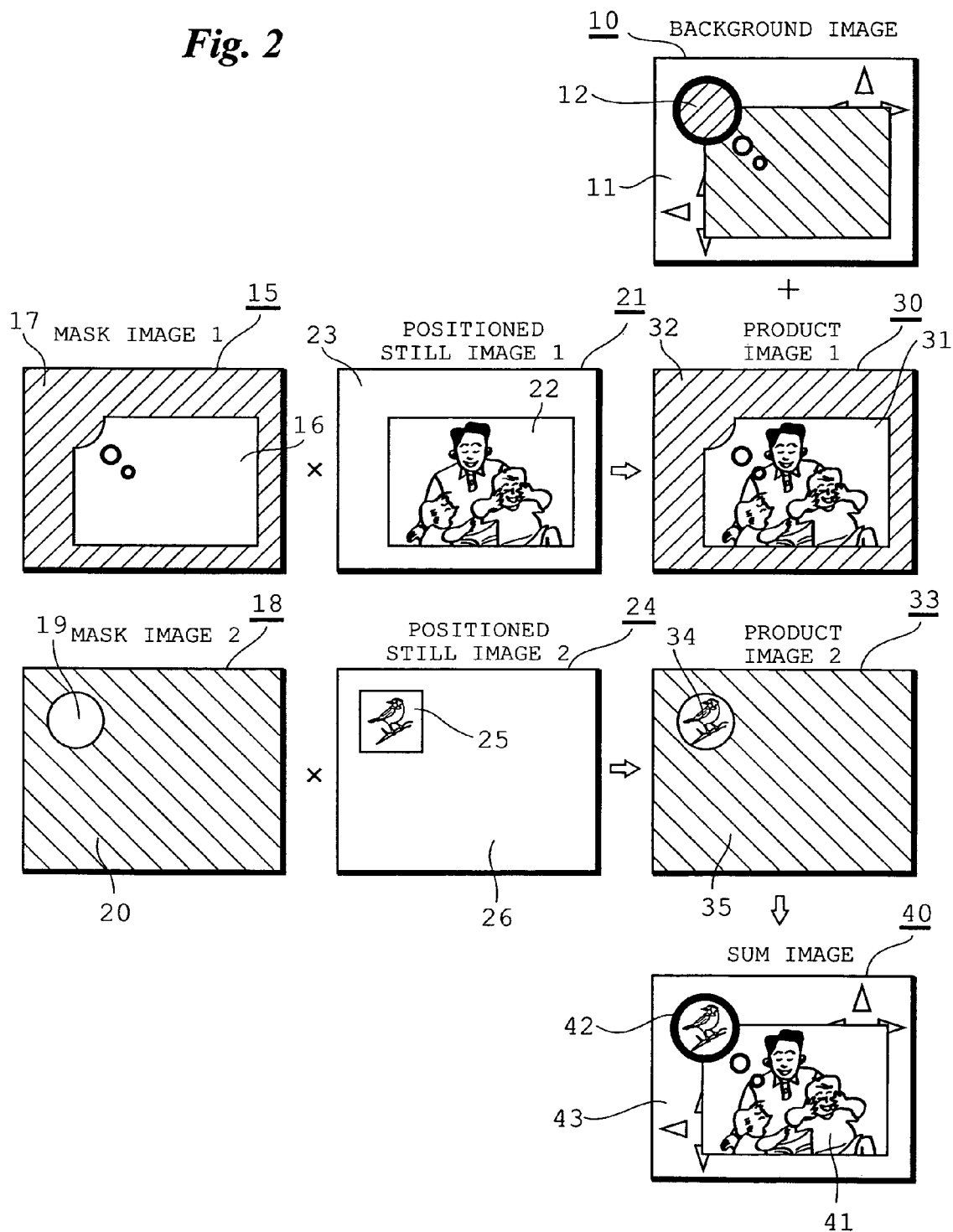
FIG. 2 illustrates the manner in which a sum image is generated.

FIG. 2 illustrates a procedure for generating one frame constituting a slideshow.

A background moving image is composed of a number of frames of a background image 10, as mentioned above. Two mask areas 11 and 12 have been defined in the background image 10 as areas in which still images are to be rendered. The mask areas 11 and 12 are so-called "black areas" (indicated by hatching) of pixel value 0. Accordingly, if other images are added to the mask areas 11 and 12, these superimposed images will be displayed.

In this embodiment, two frames of still images are rendered in one frame of the background image 10. To achieve this, the two mask areas 11 and 12 have been defined in the background image 10, as mentioned above, and two frames of mask images 15 and 18 are prepared. A still-image rendering area 16 in which a still image is to be rendered has been defined in the first mask image 15. The area other than the still-image rendering area 16 is adopted as a mask area 17 in the first mask image 15. A still-image rendering area 19 in which a still image is to be rendered has been defined in the second mask image 18 as well. The area other than the still-image rendering area 19 is adopted as a mask area 20 in the second mask image 18.

The still-image rendering areas 16 and 19 in the mask areas 15 and 18, respectively, are so-called "white areas" of pixel value 255 (in case of 8-bit representation). It goes without saying that it will suffice if the still-image rendering areas 16 and 19 are pixels all of the same value other than 0, and these areas need not necessarily be white areas of pixel value 255.

A first still image 21 by which the first mask image 15 is multiplied is represented by still-image data that has been read from a memory card. The position of an image portion 22 of the still image has been decided by scenario data regarding a background image to be combined. The image portion 22 of the first still image 21 corresponds to the still-image rendering area 16 of the first mask image 15, and an image portion 23 from which the image portion 22 of the still image is excluded corresponds to the mask area 17 of the first mask image 15. Similarly, a second still image 24 by which the second mask image 18 is multiplied is represented by still-image data that has been read from a memory card. The position of an image portion 25 of the still image has been decided by scenario data regarding a background image to be combined. The image portion 25 of the second still image 24 corresponds to the still-image rendering area 19 of the second mask image 18, and an image portion 26 from which the image portion 25 of the still image is excluded corresponds to the mask area 20 of the second mask image 18.

A first product image 30 is obtained by multiplying the first mask image 15 by the positioned first still image 21. The first product image 30 contains a still-image rendering area 31 and a mask area 32. The mask area 17 of the first mask image 15 is of pixel value 0. By multiplying the first mask image 15 by the first still image 21, therefore, the mask area 32 corresponding to the mask area 17 of the first mask image 15 is generated in the first product image 30. It will be understood that since the still-image rendering area 16 of the first mask image 15 is a white area, the still-image portion 22 of the first still image 21 appears in the still-image rendering area 31 of the first product image 30. Similarly, a second product image 33 is obtained by multiplying the second mask image 18 by the positioned first still image 24. The second product image 33 contains a mask area 35 corresponding to the mask area 20 of the second mask image 18, and a still-image rendering area 34 corresponding to the still-image portion 25 of the second still image 24.

If the background image 10, the first product image 30 and the second product image 33 are added, a sum image 40 is obtained. The sum image 40 contains a first still-image area 41 in which the still-image portion 22 of the first still image 21 appears, a second still-image area 42 in which the still-image portion 25 of the second still image 24 appears, and a background image area 43 in which an image of the background portion of the background image 10 appears. Thus, an image (the sum image 40) constituting one frame of a slideshow is generated. By similarly generating images with regard to other frames, display moving-image data for displaying a slideshow is obtained. Owing to a frame-to-frame change in the positions of the first still-image area 41, second still-image area 42 and background image area 43 constituting the sum image 40, these frames are displayed successively to present a slideshow.

Since images obtained from a plurality of frames of still images are represented in one frame in the sum image generated, a sophisticated slideshow is the result. In particular, it will suffice to simply add the background image 10, first product image 30 and second product image 33, and the order in which these are added (the order in which the images are superimposed in a case where images are superimposed) does not matter. This means that the structure of the circuitry for generating the sum image is comparatively simple.

FIG. 3 illustrates an example of scenario data.

Scenario data defines the rendering of a still image in one frame of an image, as mentioned above. A rendering position number, combining position X, combining position Y, image width, image height and angle of rotation are defined in correspondence with the frame number of the image of each frame constituting the slideshow.

The rendering position number is a number that identifies the rendering position of a still image in one frame of an image constituting a slideshow. It will be understood that since rendering position numbers corresponding to Frame No. 1 are 1 and 2, still images rendered in the image of Frame No. 1 are two in number.

The combining positions X and Y define the rendering position of a still image. The still image is positioned in such a manner that the upper-left corner of the still image to be rendered will conform to the coordinates stipulated by the combining positions X and Y.

Image width and height define the size of the still image. The still image is subjected to enlargement or reduction processing in such a manner that the still image to be rendered will fit into the area stipulated by the width and height of the image.

Angle of rotation defines the angle of rotation of the still image and indicates the relative angle of rotation with respect to the rendering area of the still image displayed in the rendering area of the still image stipulated by the above-mentioned combining position X, combining position Y, image width and image height.

By way of example, if the sum image described in FIG. 2 is the second frame, then the still-image portion 22 of the first still image 21 is specified by Rendering Position No. 1, and the combining position (X,Y) of this image portion is represented by (X1,Y1). The coordinates of the upper-left corner of the still-image portion 22 conform to this combining position (X1,Y1). Further, the still-image portion 22 is defined by image width W1 and image height H1, and the angle of rotation is expressed by $\theta 1$. Similarly, the still-image portion 25 of the second still image 24 is specified by Rendering Position No. 2, and the coordinates of the upper-left corner conform to the combining position (X2,Y2). Furthermore, the still-image portion 25 is defined by image width W2 and height H2, and the angle of rotation is expressed by θ2.

Figure 4:
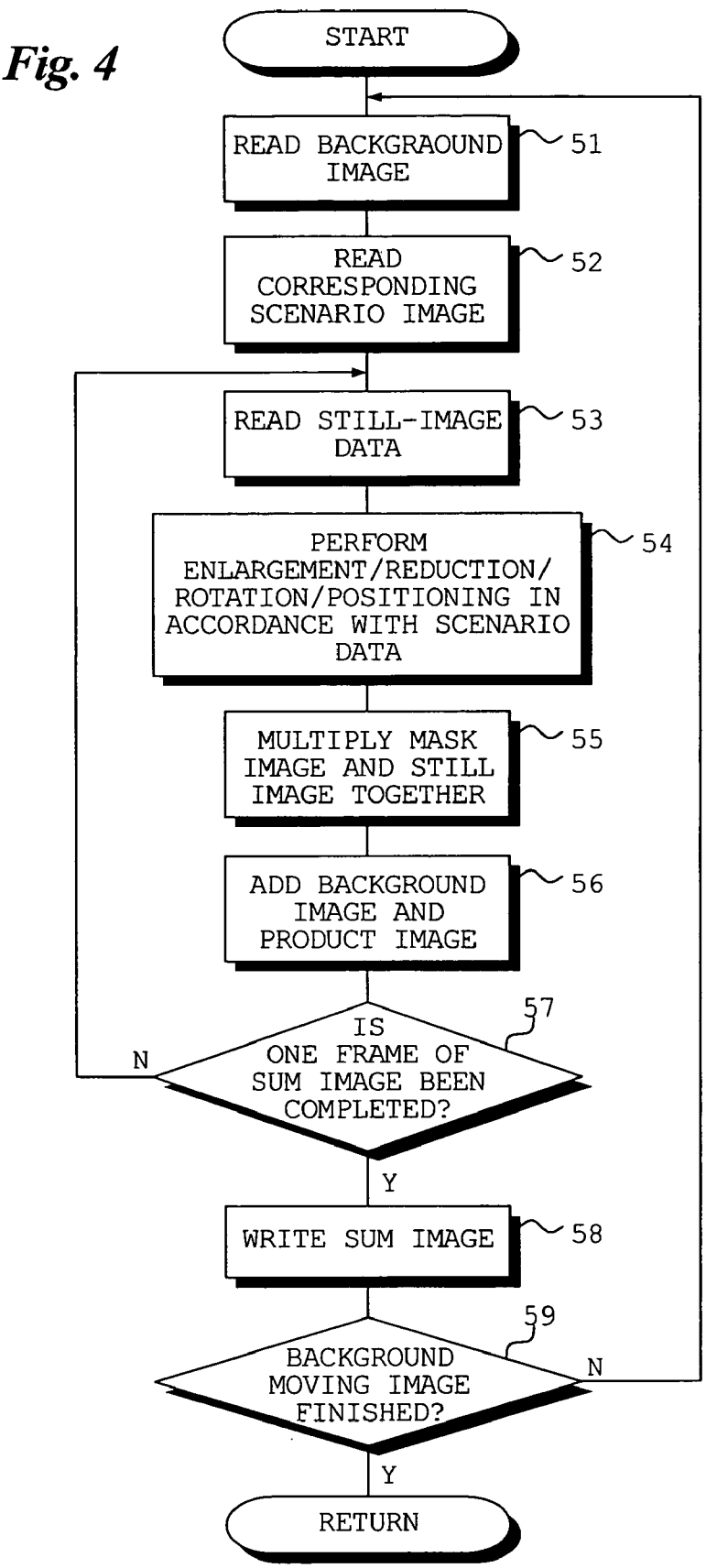
FIG. 4 is a flowchart illustrating processing for generating a sum image constituting a slideshow.

FIG. 4 is a flowchart illustrating processing for generating a sum image constituting a slideshow.

First, the background image is read (step 51), then scenario data corresponding to the read background image is read (step 52). Next, still-image data representing the first frame of a still image to be rendered on this background image is read (step 53). Enlargement, reduction, rotation and positioning of the still image are carried out in accordance with the scenario data (step 54). The mask image and the still image that has undergone positioning and the like are multiplied together to obtain a product image (step 55). The product image obtained and the background image are added to obtain a sum image (step 56). If there is a still image to be rendered on the sum image, one frame of the sum image will be incomplete ("NO" at step 57) and therefore the processing of steps 53 to 56 is repeated.

If there is no still image to be rendered on the sum image obtained, then it is construed that one frame of the sum image has been completed ("YES" at step 57) and the image data representing the sum image obtained is written temporarily to the memory of the moving-image combining engine (step 58).

By repeating the processing of steps 51 to 58 with regard to all background images constituting the background moving image ("NO" at step 59), all sum images constituting the slideshow are obtained ("YES" at step 59).

Figure 5:
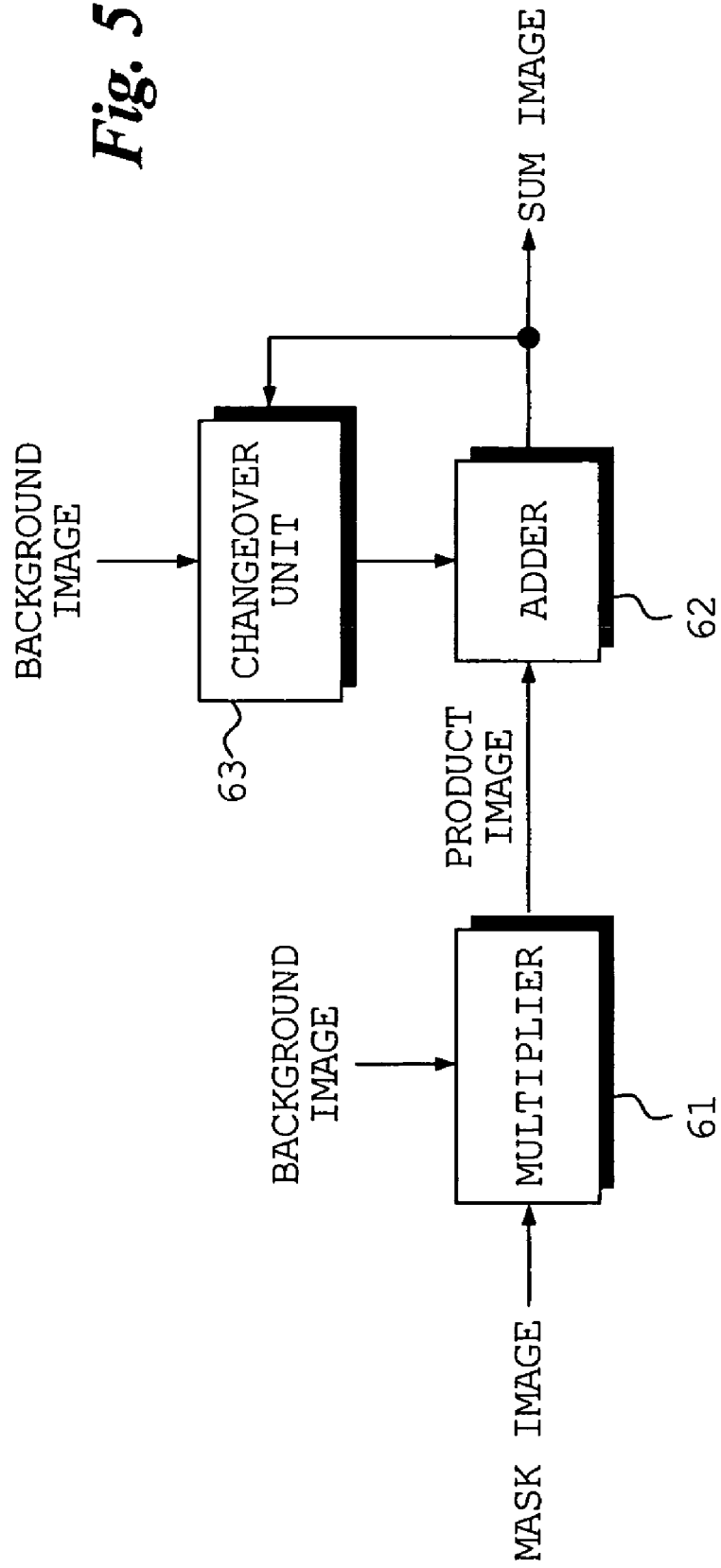
FIG. 5 is a block diagram illustrating part of a moving-image combining engine for generating a sum image.
Figure 6:
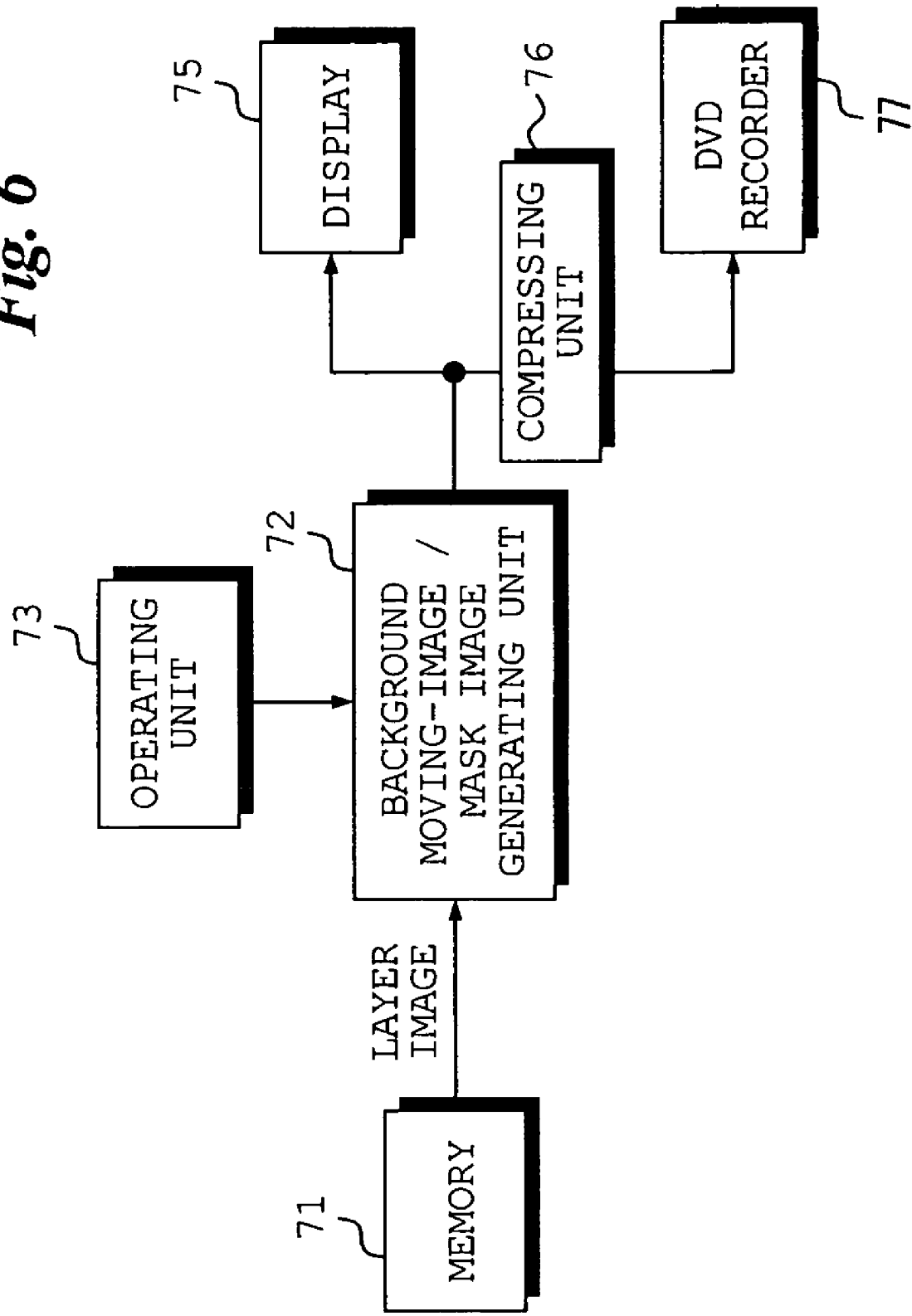
FIG. 6 is a block diagram illustrating the electrical structure of an apparatus for generating slideshow data.

FIG. 5 is a block diagram illustrating part of a moving-image combining engine for generating the sum image described above.

Data representing a background image is applied to an adding circuit 62 via a changeover circuit 63. Further, data representing a mask image and still-image data representing a still image that has been positioned is input to a multiplying circuit 61, whereby the items of data are multiplied together. Image data representing the product image is output from the multiplying circuit 61 and input to the adding circuit 62. The latter adds the product image and the background image to obtain the sum image. The data representing the sum image is applied to the changeover circuit 63. In a case where a still image is rendered on the sum image obtained (i.e., in a case where there are a plurality of still-image portions), the changeover circuit 63 is changed over in such a manner that the sum-image data that has been output from the adding circuit 62 is input to the adding circuit 62. As a result, image data representing the product image of the next frame that will be output from the multiplying circuit 61 is input to the adding circuit 62 and thus is further added to the sum image. As illustrated in FIG. 2, a sum image in which a plurality of still-image portions are contained in one frame is obtained. The circuits 61 to 63 are controlled by a control unit (not shown), which is included in the moving-image combining engine 3, so as to obtain a number of frames of sum images.

FIGS. 6 to 12 illustrate the generation of the above-described background image 10, first mask image 15 and second mask image 17.

Image data representing a plurality of layer images (the details will be described later with reference to FIG. 8) for which the above-described sum image is obtained by superimposing of images from the lowermost layer has been stored in a memory 71. The image data representing the plurality of layer images is applied to a background moving-image/mask image generating unit 72. An operating signal from an operating unit 73 also is applied to the background moving-image/mask image generating unit 72.

The background image 10, first mask image 15 and second mask image 17 are generated in the background moving-image/mask image generating unit 72. The generated background image 10 and other images are displayed on a display unit 75, whereby the images are checked by the operator. The image data representing the generated background image 10 and other image is compressed in a compressing circuit 76 (the details will be described in conjunction with FIGS. 13 and 14). The image data that has been compressed is recorded on a DVD (not shown) by a DVD recorder 77. A slideshow can be generated by loading the DVD into the slideshow generating apparatus. Of course, the image data representing the background image 10 and other images need not necessarily be compressed.

Figure 7:
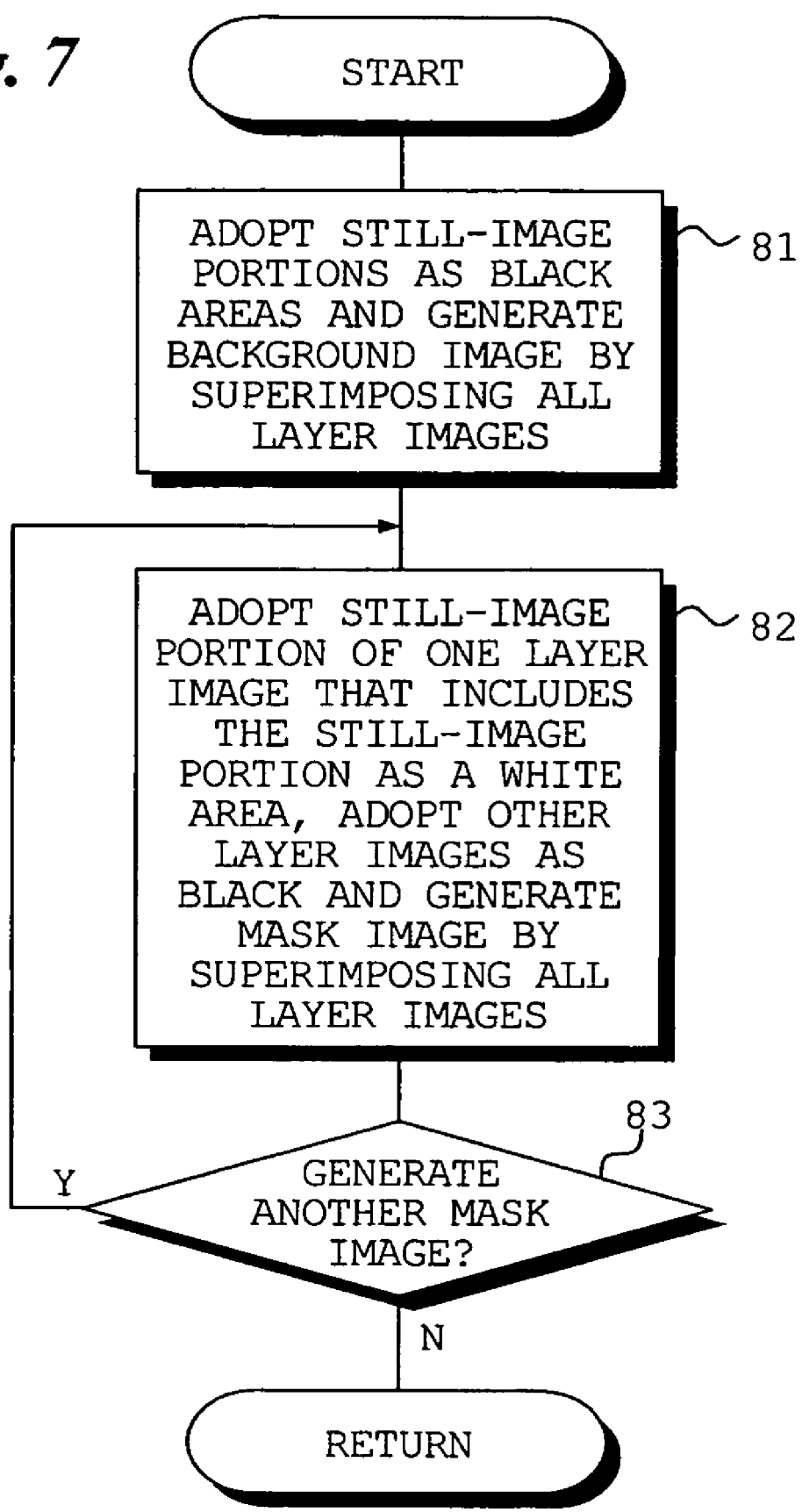
FIG. 7 is a flowchart illustrating processing for generating slideshow data.
Figure 8:
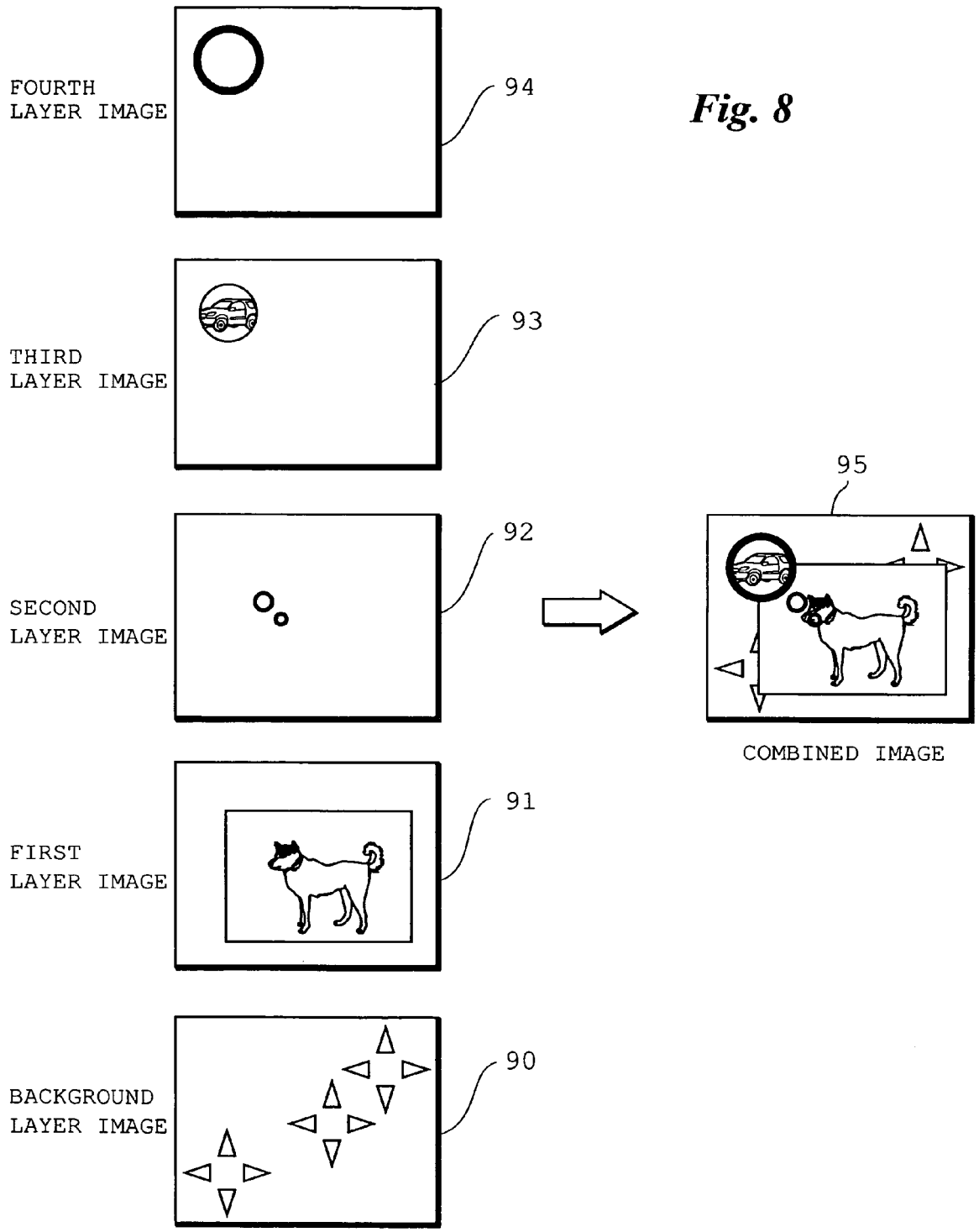
FIG. 8 illustrates the manner in which a combined image is generated.

FIG. 7 is a flowchart illustrating processing for generating image data representing the background image 10, etc. FIG. 8 illustrates an example of layer images, etc., used in order to generate image data representing the background image 10, etc.

A background layer image 90, first layer image 91, second layer image 92, third layer image 93 and fourth layer image 94 are prepared. These images 90 to 94 are superimposed in the order mentioned, whereby there is generated a combined image 95 corresponding to the sum image 40 (see FIG. 2) that is to become the above-mentioned target, as illustrated on the right side of FIG. 8.

The background layer image 90 is one in which the background-image portion from which the mask areas 11 and 12 of the above-described background image 10 (see FIG. 2) have been excluded is being displayed over the entirety of the screen. The first layer image 91 is positioned at the same position as that of the first still image 21 (see FIG. 2) positioned as described above and contains any still-image portion having a shape identical with that of the still-image rendering area 16 of the first mask image 15. The second layer image 92, which represents a decorative image displayed on the background image 10, is displayed on the still image 21 positioned as set forth above. The third layer image 93 is positioned at the same position as that of the second still image 24 (see FIG. 2) positioned as described above and contains any still-image portion having a shape identical with that of the still-image rendering area 19 of the second mask image 18. The fourth layer image 94, which also represents a decorative image displayed on the background image 10 in a manner similar to that of the second layer image 92, embellishes the second still image 24 positioned as set forth above.

Among the layer images 90 to 94, the third layer image 93 is obtained by preparing any still image 96, which has been positioned at a position identical with that of the second still image 24 (see FIG. 2) on which a still-image portion 97 has been positioned, and a mask image 98 having an area 99 corresponding to the still-image rendering area of the background image 10, and masking the still image 96 by the mask image 98.

First, the still-image portions (the still-image portions of the layer image 91 and the layer image 94) among the layer images 90 to 94 are assumed to be black. The background layer image 90, the first layer image 91 in which the background-image area is assumed to be black, the second layer image 92, the third layer image 93 in which the still-image portion is assumed to be black and the fourth layer image 94 are superimposed in the order mentioned. This results in the generation of the background image 10 shown in FIG. 10 (step 81).

Next, the still-image portion of one layer image (e.g., the first layer image 91) that contains a still-image portion is assumed to be white, the still-image portions with regard to the other layer images are assumed to be black, and all of these layer images are superimposed in the following order: the background layer image 90, the first layer image 91, the second layer image 92, the third layer image 93 and the fourth layer image 94. This results in the generation of the first mask image 15 shown in FIG. 11 (step 82).

If it is necessary to generate another mask image (as in a case where a plurality of mask images are generated) ("YES" at step 83), the layer image of the still-image portion assumed to be a white area is changed and the processing of step 82 is executed again. By way of example, the still-image portion of the third layer image 93 is adopted as a white area, the image portions regarding other layer images are assumed to be black, and all of these layer images 90 to 94 are superimposed in the following order: the background layer image 90, first layer image 91, second layer image 92, third layer image 93 and fourth layer image 94, whereby the second mask image 17 shown in FIG. 12 is generated (the second mask image 17 and the mask image 98 shown in FIG. 9 merely happen to coincide and are not always the same).

Thus, all of the background images and mask images of the multiplicity of frames that constitute the background moving image are generated in similar fashion.

In a case where one frame of an image constituting a slideshow is generated by superimposing layers from the lowermost layer, as in the prior art, layer images of a multiplicity of frames are necessary. In this embodiment, however, one frame of an image (the sum image) constituting a slideshow can be generated merely by using background and mask images, as illustrated in FIG. 2.

Figure 10:
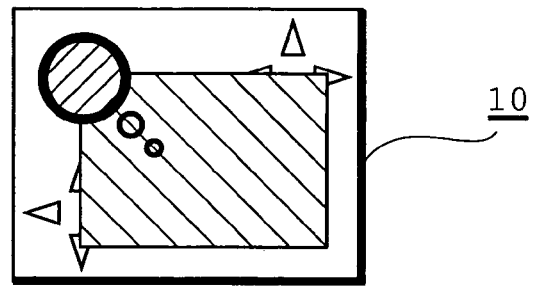
FIG. 10 illustrates an example of a background image.
Figure 11:
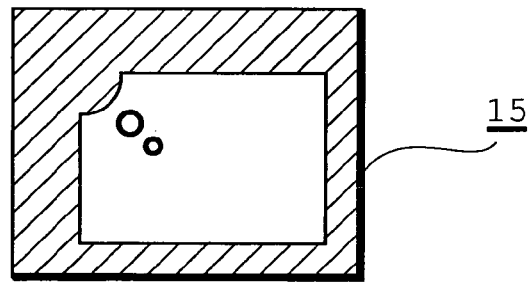
FIGS. 11 and 12 show examples of mask images.
Figure 12:
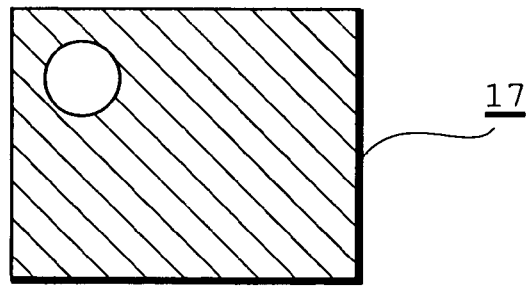

The combined image 95 shown on the right side of FIG. 8 can also be utilized to generate the background image 10, first mask image 15 and second mask image 17 illustrated in FIGS. 10, 11 and 12. In a case where the background image 10 is generated, all of the still-image portions of the combined image 95 are adopted as mask areas. If this is done, the background image 10 shown in FIG. 10 is obtained. Further, in the combined image 95, if a still-image rendering area is generated by adopting a white area with regard to a specific still-image portion and a mask area that will become a black area is generated with regard to portions other than the specific still-image portion, then the first mask image 15 shown in FIG. 11 or the second mask image 17 shown in FIG. 12 will be generated.

Figure 13:
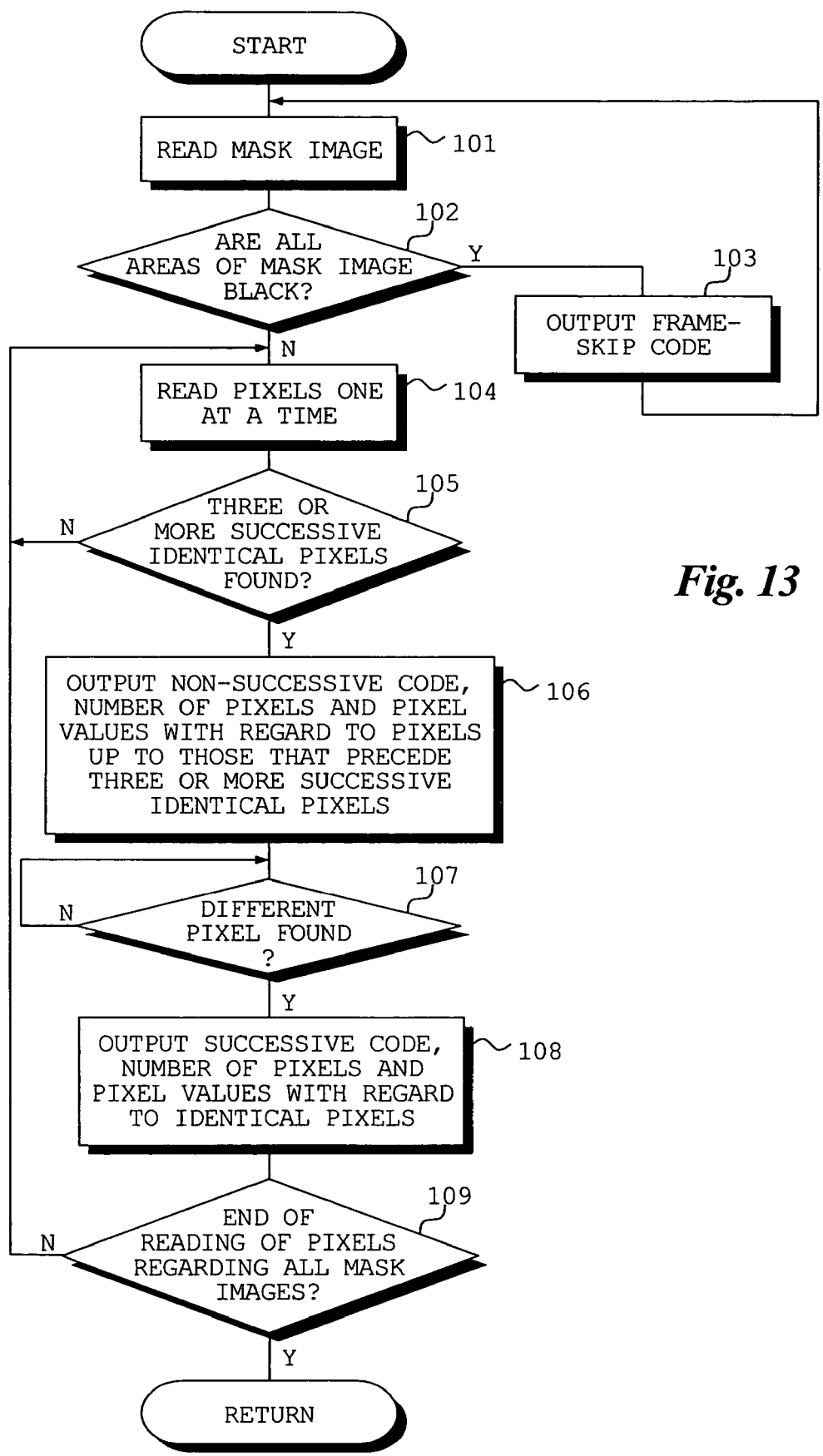
FIG. 13 is a flowchart illustrating processing for compressing a mask image.
Figure 14:
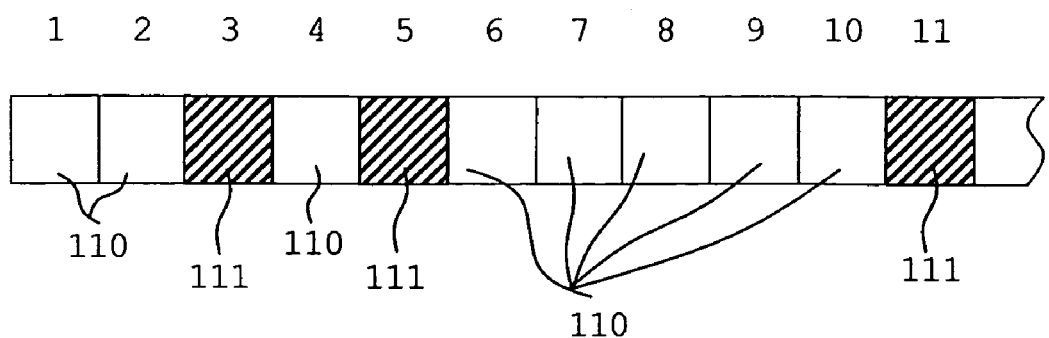
FIG. 14 illustrates part of an array of pixels constituting a mask image.

FIGS. 13 and 14 are useful in describing a method of compressing data representing a mask image generated in the manner set forth above (the background image can also be compressed in a similar manner). FIG. 13 is a flowchart illustrating compression processing.

First, a mask image is read (step 101) and it is determined whether all areas of the read mask image are black (i.e., whether it is an image of a frame that does not contain a still image) (step 102). If all areas are black ("YES" at step 102), then a frame-skip code indicating that all areas are black is output (step 103). If all areas are not black ("NO" at step 102), then the mask image is read one pixel at a time (step 104).

The reading of pixels one pixel at a time is repeated until three or more successive identical pixels (e.g., pixels representing white, pixels representing black, etc.) are found. If three or more successive identical pixels are found ("YES" at step 105), a non-successive code, number of pixels and pixel values of each of these pixels are output with regard to pixels up to those that precede the three or more successive identical pixels (step 106).

The reading of pixels continues. If a different pixel is found ("YES" at step 107), then a successive code, number of pixels and pixel values of each of these pixels are output with regard to identical pixels up to those that prevailed prior to the discovery of the different pixel (step 108).

The processing of steps 104 to 108 is repeated until the reading of pixels ends with regard to all mask images (step 109).

FIG. 14 illustrates part of a pixel array of a mask image. Pixels 110 are white pixels, and pixels 111 indicated by hatching are black pixels.

The first, second, fourth and sixth through tenth pixels 110 are the white pixels, and the third, fifth and eleventh pixels 111 are the black pixels.

In a case where pixels have been read in order starting from the first pixel, three successive identical pixels 110 are found if pixels are read up to the eighth pixel. Accordingly, with regard to the first to fifth pixels, which are pixels that precede the three successive identical pixels from the sixth to the eighth, a non-successive code, the number (i.e., five) of pixels and the pixel values of each of these pixels are output.

If the reading of pixels continues, the eleventh pixel 111 becomes a black pixel and thus a pixel appears that is different from the white pixels 110, which are the identical pixels up to this black pixel 111. Accordingly, a successive code, number of pixels and the identical pixel values are output with regard to the sixth to tenth pixels.

Since identical pixels often appear in succession in a mask image, highly efficient compression can be performed.

As many apparently widely different embodiments of the present invention can be made without departing from the spirit and scope thereof, it is to be understood that the invention is not limited to the specific embodiments thereof except as defined in the appended claims.

What is claimed is:

1. A slideshow generating apparatus comprising:
 a background moving-image storage device for storing background moving-image data representing a background moving image composed of a number of frames of a background image wherein an area in which a still image is rendered has been defined as a mask area;
 a still-image data input device for inputting still-image data;
 a scenario data storage device for storing scenario data that defines a position corresponding to the mask area in the background image, said position being one at which the still image represented by the still-image data that has been input from said still-image data input device is rendered;
 a positioning device for positioning the still image, which is represented by the still-image data that has been input from said still-image data input device, at the position represented by the scenario data stored in said scenario data storage device;
 a mask-image data storage device for storing mask-image data representing a mask image in which a still-image rendering area has been defined in association with the mask area of the background image, an area from which the still-image rendering area has been excluded being defined as a mask area; and
 a moving-image combining device for generating moving-image data for display by repeatedly executing, with regard to the number of frames of the background image, processing that combines the background image constituting the background moving image represented by the background moving-image data that has been stored in said background moving-image data storage device, the still image that has been positioned by said positioning device, and the mask image represented by the mask-image data that has been stored in said mask image-data storage device.

2. The apparatus according to claim 1, wherein said moving-image combining device includes:

a multiplying circuit for multiplying the mask image and the still image that has been positioned by said positioning device, thereby generating a product image;

an adding circuit for adding the background image and the product image generated by said multiplying circuit; and a controller for controlling said multiplying circuit and said adding circuit so as to repeat, with regard to the number of frames of the background image, multiplication processing performed in said multiplying circuit and addition processing performed in said adding circuit.

3. A method of controlling a slideshow generating apparatus, comprising the steps of:

storing background moving-image data representing a background moving image composed of a number of frames of a background image wherein an area in which a still image is rendered has been defined as a mask area;

storing mask-image data representing a mask image in which a still-image rendering area has been defined in association with the mask area of the background image, an area from which the still-image rendering area has been excluded being defined as a mask area;

inputting still-image data;

storing scenario data that defines a position corresponding to the mask area in the background image, said position being one at which the still image represented by the still-image data that has been input is rendered;

positioning the still image, which is represented by the still-image data that has been input, at the position represented by the scenario data stored; and generating moving-image data for display by repeatedly executing, with regard to the number of frames of the background image, processing that combines the background image constituting the background moving image represented by the background moving-image data that has been stored, the still image that has been positioned, and the mask image represented by the mask-image data that has been stored.

4. A computer-readable medium storing a program for controlling a slideshow generating apparatus so as to cause the apparatus to:

store background moving-image data representing a background moving image composed of a number of frames of a background image wherein an area in which a still image is rendered has been defined as a mask area;

store mask-image data representing a mask image in which a still-image rendering area has been defined in association with the mask area of the background image, an area from which the still-image rendering area has been excluded being defined as a mask area;

input still-image data;

store scenario data that defines a position corresponding to the mask area in the background image, said position being one at which the still image represented by the still-image data that has been input is rendered;

position the still image, which is represented by the still-image data that has been input, at the position represented by the scenario data stored; and generate moving-image data for display by repeatedly executing, with regard to the number of frames of the background image, processing that combines the background image constituting the background moving image represented by the background moving-image data that has been stored, the still image that has been positioned, and the mask image represented by the mask-image data that has been stored.

* * * * *